UNITED STATES PATENT OFFICE.

EDMOND O. BAUJARD, OF AUBERVILLIERS, FRANCE, ASSIGNOR TO JOHN W. MACKAY, OF VIRGINIA CITY, NEVADA.

EXTRACTING GLYCERINE.

SPECIFICATION forming part of Letters Patent No. 280,894, dated July 10, 1883.

Application filed May 29, 1883. (No specimens.)

*To all whom it may concern:*

Be it known that I, EDMOND O. BAUJARD, of Aubervilliers, Seine, France, have invented a certain new and useful Improvement in Extracting Glycerine, of which the following is a specification.

The object of this invention is to extract glycerine from fatty substances and oils.

The improvement involves a mode of purifying lime for use in extracting glycerine.

The improvement also consists in the use of a zinc preparation in the extraction of glycerine.

The improvement also consists in the use of lime and a zinc preparation in extracting glycerine.

In carrying out my improvement, I take unslaked lime and wash it. Preferably the lime is placed in a receptacle with ordinary water, and stirred until thoroughly subjected to the action of the water. Afterward the water may be run off and distilled water will be introduced, or the lime may be removed to another receptacle and subjected to the action of distilled water. The water will be stirred as before, so as to act on all particles of the lime. There may be two washings in distilled water; but it is preferable to perform the first washing with ordinary water and the second with distilled water, so as to save as much distilled water as possible. The washing of the lime removes from it the chlorides, as well as other matters ordinarily present in it, and which are objectionable when the lime is to be used in extracting glycerine.

The fatty substances or oils from which the glycerine is to be extracted are introduced into a digester. For every one thousand pounds of the fatty substances or oils I also introduce about three hundred and thirty-three and one-third pounds of water. This water may advantageously be distilled water. I also introduce for each one thousand pounds of the fatty substances or oils from one to two pounds of a zinc preparation. The quantity will vary between these limits according to the nature of the fatty matters or oils to be treated. I also introduce of the purified lime from about two and one-half pounds to five pounds for each one thousand pounds of the fatty substances or oils, according to the nature of the latter.

The zinc preparation may consist of oxide of zinc powdered or reduced to fine particles. Preferably it will be put in water and stirred before being introduced into the digester, so that the particles will not stick together when introduced, but will be distributed through the contents of the digester. The contents of the digester may be kept stirred by steam or by a mechanical agitator. Steam is introduced into the digester and maintained therein at a pressure of from about one hundred and twenty-five to about one hundred and fifty pounds during a period of from three to four hours. After saponification takes place the contents of the digester are run off to a suitable receptacle, and when the water containing glycerine has become separated from the fatty acids I run it into an evaporator. The impurities freed in the digester may be skimmed and separated by filtration. The water containing the glycerine will be evaporated to the desired degree, and the fatty acids may be treated in the usual or any other suitable manner.

What I claim as my invention, and desire to secure by Letters Patent, is—

1. In the extraction of glycerine from fatty substances and oils, the preparation of lime, consisting in washing it in water, substantially as specified.

2. In the extraction of glycerine from fatty substances and oils, the use of lime and a zinc preparation, substantially as specified.

3. The process of extracting glycerine from fatty substances and oils, which consists in combining with said fatty substances and oils a zinc preparation, substantially as specified.

EDMOND O. BAUJARD.

Witnesses:
H. DE CASTRO,
JAMES R. BOWEN.